(12) United States Patent
Ishido (10) Patent No.: US 8,705,153 B2
(45) Date of Patent: Apr. 22, 2014

(54) ORIGINAL READING APPARATUS READING IMAGE FROM ORIGINAL

(75) Inventor: Katsuhiro Ishido, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 274 days.

(21) Appl. No.: 13/165,043

(22) Filed: Jun. 21, 2011

(65) Prior Publication Data

US 2012/0008180 A1  Jan. 12, 2012

(30) Foreign Application Priority Data

Jul. 7, 2010   (JP) ................................ 2010-155253

(51) Int. Cl.
*H04N 1/04* (2006.01)
(52) U.S. Cl.
USPC ............ 358/509; 358/474; 358/475; 358/497
(58) Field of Classification Search
USPC .......................... 358/509, 474, 475, 497, 498
See application file for complete search history.

(56) References Cited

U.S. PATENT DOCUMENTS

| | | | |
|---|---|---|---|
| 7,672,019 B2 * | 3/2010 | Misaka | 358/3.27 |
| 7,782,503 B2 | 8/2010 | Ishido et al. | 358/498 |
| 2008/0198393 A1 * | 8/2008 | Fujiwara et al. | 358/1.9 |

FOREIGN PATENT DOCUMENTS

| | | |
|---|---|---|
| JP | 2003-143421 | 5/2003 |
| JP | 2004-241809 | 8/2004 |
| JP | 2006-340232 | 12/2006 |
| JP | 2009-189012 | 8/2009 |

* cited by examiner

*Primary Examiner* — Houshang Safaipour
(74) *Attorney, Agent, or Firm* — Fitzpatrick, Cella, Harper & Scinto

(57) ABSTRACT

A plurality of line sensors corresponding to a plualrity of color components receive reflected light passed through an imaging unit and convert the light into a plurality of color component data. A correcting unit performs color misalignment correction based on a reference color component for which resolution performance is lowest among the plurality of color component, on the color component data corresponding to other color components.

8 Claims, 10 Drawing Sheets

ORIGINAL READING APPARATUS READING IMAGE FROM ORIGINAL

BACKGROUND OF THE INVENTION

1. Field of the Invention

The present invention relates to an original reading apparatus that reads an image from an original.

2. Description of the Related Art

Generally, an image reading apparatus that reads a color image from an original is provided with three line sensors. Each line sensor reads one of pieces of color information corresponding R (red), G (green), and B (blue). A color filter for separating light and an imaging lens for imaging light are provided on an optical path from an original to each line sensor. On an imaging lens or an original stage glass, chromatic aberration depending on the wavelength of light is generated. Accordingly, even when an image at the same position on an original is read by the line sensors, the positions of images projected on the line sensors slightly differ from each other, and this difference appears as so-called color misalignment. Japanese Patent Laid-Open No. 2006-340232 discloses a technique that reads thin lines to detect color misalignment amounts, obtains R and G color misalignment amounts as the numbers of pixels using B as a reference, and corrects the misalignment through image processing according to the misalignment amounts.

SUMMARY OF THE INVENTION

If color misalignment of R and G is corrected using B as a reference as in Japanese Patent Laid-Open No. 2006-340232, color misalignment due to positional misalignment of images projected on the line sensors is corrected, but color misalignment due to a difference between the resolution performances of the line sensors remains. This difference between the resolution performances of the line sensors is caused by the fact that the R, G, and B line sensors are at the same position in the optical axis direction although the R, G, and B imaging positions in the optical axis direction differ from each other due to chromatic aberration at the imaging lens or the original stage glass. Furthermore, if color misalignment is corrected as in Japanese Patent Laid-Open No. 2006-340232, the resolution performance for a color image for which color misalignment (positional misalignment) has been corrected through image processing deteriorates. For example, it is assumed that R color misalignment is corrected using B as a reference in the case where the resolution performance of the R line sensor is lower than that of the B line sensor. That is to say, if R positional misalignment is corrected without correcting B positional misalignment, a difference between the R and B resolution performances increases. If a difference between resolution performances for colors increases, a difference between image sharpnesses of the colors increases, and the color misalignment increases. Thus, the present invention has a feature of improving image quality by correcting color misalignment in consideration of the resolution performances of a plurality of line sensors.

The present invention provides an original reading apparatus comprising the following elements. A light source illuminates an original. An imaging unit images reflected light from the original illuminated by the light source. A plurality of line sensors corresponding to a plualrity of color components configured to convert the reflected light passed through the imaging unit into a plurality of color component data. A correcting unit performs color misalignment correction based on a reference color component for which resolution performance is lowest among the plurality of color component, on the color component data corresponding to other color components.

Further features of the present invention will become apparent from the following description of exemplary embodiments with reference to the attached drawings.

DESCRIPTION OF THE EMBODIMENTS

Figure 1:
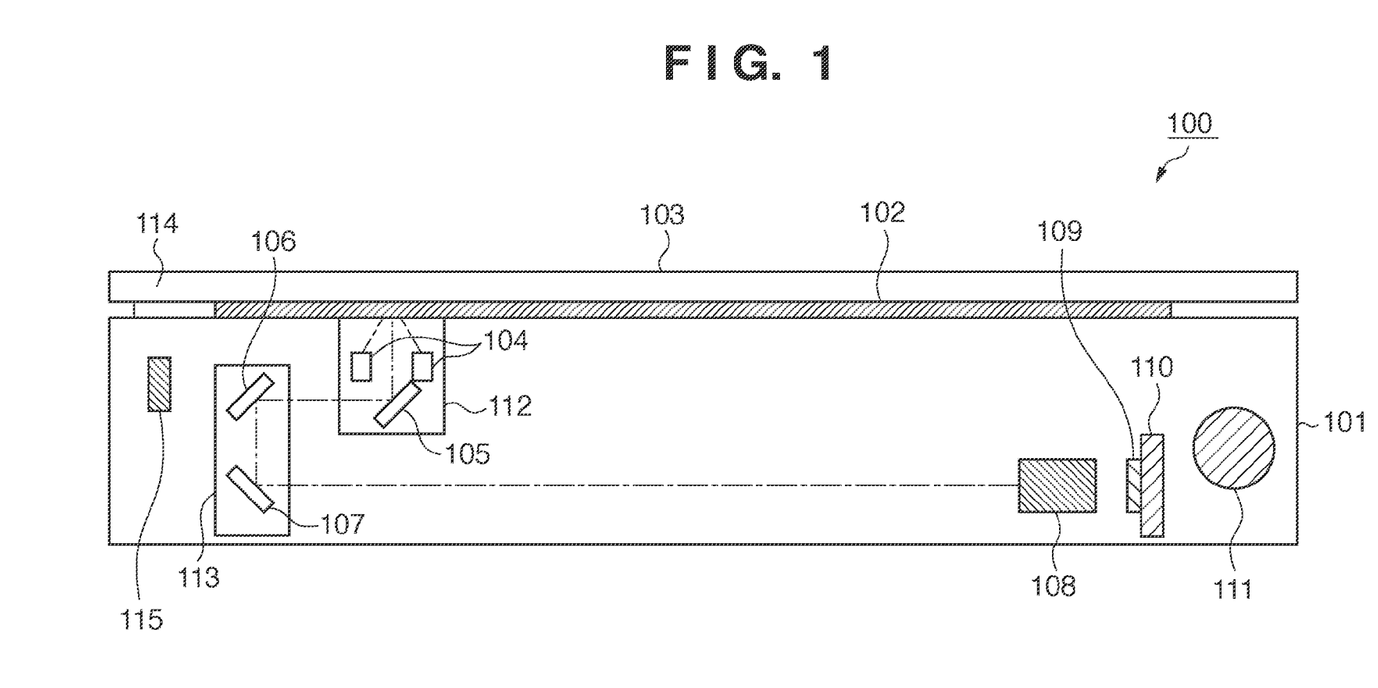
FIG. 1 is a view showing an exemplary schematic configuration of an original reading apparatus.

An image reading apparatus 100 shown in FIG. 1 is an example of an image reading apparatus that is applied to a copier, a multifunction peripheral, or a facsimile, or an original reading apparatus that is used connected with a host computer. An original reading unit 101 is provided with an illumination system that illuminates an original, an optical system that forms an image of light from an original at a predetermined imaging position, and a capture system that captures a formed image. Here, the imaging position refers to a point (image point) at which light from an object point is imaged on an image surface. The imaging optical system is designed such that the imaging position is on a light-receiving face of a line sensor. The reason for this is that the image sharpness increases when the imaging position is on a light-receiving face of a line sensor. However, due to manufacturing errors or the like, the imaging position may not be on a light-receiving face of a line sensor. Here, a position at which light directed from an object point to an imaging position is incident on the light-receiving face is referred to as a position of an image or a projection position of an image. Without manufacturing errors or the like, the position of an image matches the imaging position.

White LEDs 104 mounted in an optical bench 112 are exemplary light sources that illuminate an original. The white LEDs 104 emit light toward an original face that is to be read. An original 102 is placed between a platen cover 103 and an original stage glass. The light from the white LEDs 104 is incident on the original 102, and is transmitted from the original 102 by reflection. The light transmitted from the original 102 is referred to as reflected light. The reflected light is first incident on a mirror 105 provided in the optical bench 112. This reflected light is light that expresses an image of the original. The light transmitted from the mirror 105 is incident on a mirror 106 provided in an optical bench 113. The light transmitted from the mirror 106 is further reflected by a mirror 107 and is incident on a lens 108. The optical benches 112 and 113 are driven by a motor 111 in the sub-scanning direction of the original. Here, as well known, the sub-scanning direction is the lateral direction in FIG. 1. Furthermore, the main-scanning direction is a direction that is perpendicular to the sub-scanning direction, and is a direction that is parallel to the normal direction of the section of the diagram in FIG. 1. A home position sensor 115 is a sensor that detects whether or not the optical bench 113 has reached the home position. When it is detected that the optical bench 113 has reached the home position, the rotation of the motor 111 changes from forward to reverse. Then, the original 102 can be scanned in the sub-scanning direction. The lens 108 condenses the reflected light from the original face guided by the optical benches 112 and 113. The condensed light is incident on a light-receiving face of a CCD line sensor 109. The CCD line sensor 109 is provided with a plurality of line sensors that convert light in mutually different wavelength bands, of the light from the original transmitted through the imaging optical system, into corresponding electrical signals. The plurality of line sensors are each extended in the main-scanning direction. That is to say, the direction in which the plurality of line sensors are extended matches the main-scanning direction. In this embodiment, for the sake of explanation, it is assumed that there are three line sensors corresponding to R, G, and B. Here, there may be four or more line sensors. The line sensors are respectively associated with mutually different wavelength bands. The line sensors are a type of photoelectric transducers, and realized as CCDs (charge coupled devices), C-MOSs, or the like. The CCD line sensor 109 is mounted on a substrate 110.

The light intensities of the white LEDs 104 when they are lit are not uniform. The sensitivities of devices constituting the line sensors of the CCD line sensor 109 are not uniform. Shading compensation is performed in order to correct these non-uniformities. A reference white plate 114 having a size that covers the entire main-scanning area is provided in order to obtain a compensation factor used in shading compensation.

Figure 2:
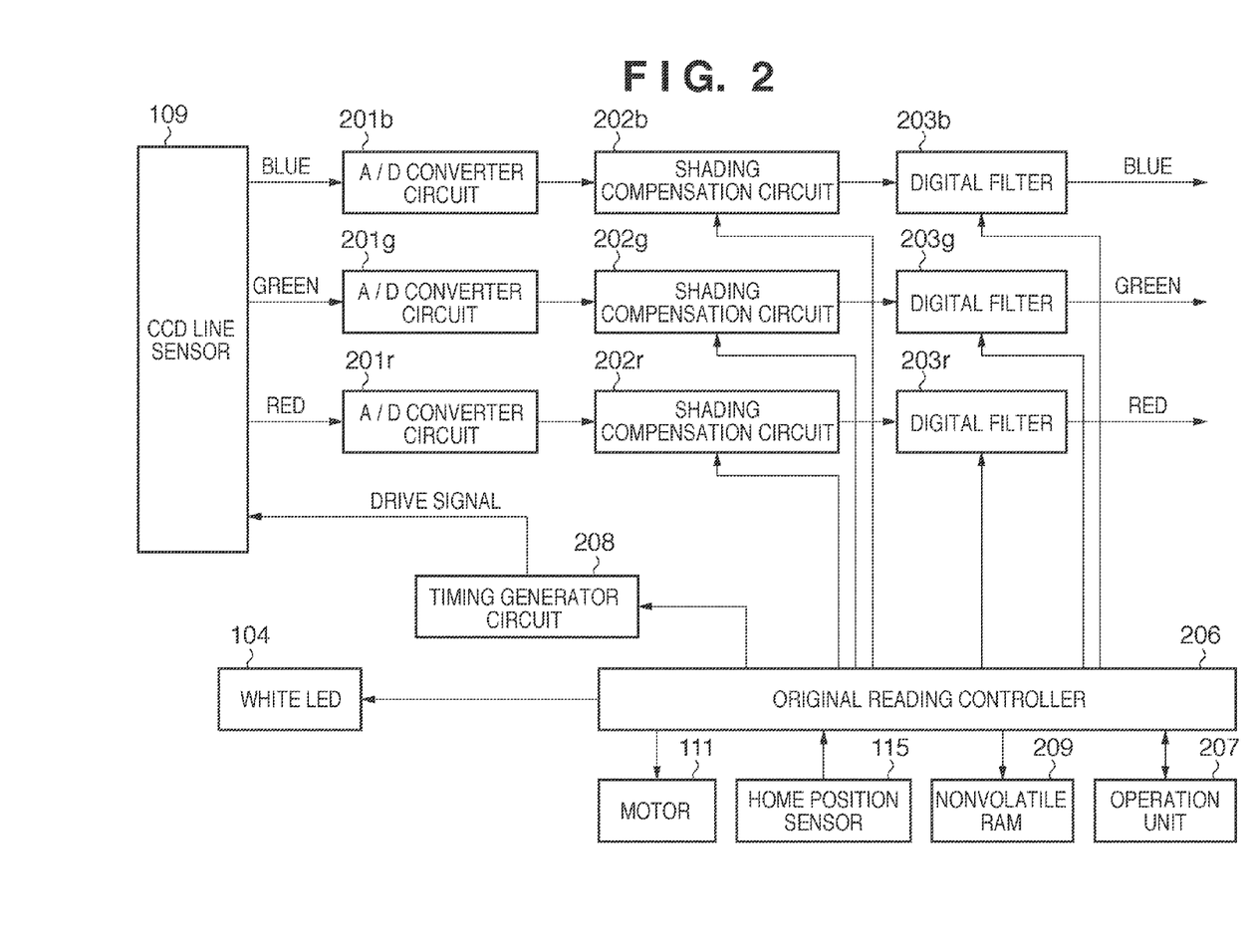
FIG. 2 is a diagram showing an exemplary configuration of a control unit.

Hereinafter, a control unit will be described with reference to FIG. 2. A timing generator circuit 208 outputs a drive signal for driving the CCD line sensor 109. The line sensors corresponding to the respective colors in the CCD line sensor 109 output image signals in response to the drive signal. A/D converter circuits 201r, 201g, and 201b perform A/D conversion respectively on the image signals corresponding to R, G, and B, and output corresponding image data. Shading compensation circuits 202r, 202g, and 202b perform shading compensation applying compensation factors (gain or offset) respectively to the image data of the corresponding colors. The shading compensation circuits 202r, 202g, and 202b determine, for each pixel, compensation factors for correcting non-uniformity in the light intensity of the white LEDs 104 when they are lit and non-uniformity in the sensitivity of the CCD line sensor 109, based on the result obtained by reading the reference white plate 114. The method for this determination is well known, and, thus, a description thereof has been omitted. The compensation factors are stored in a memory provided in an original reading controller 206, a nonvolatile RAM 209, or the like. The original reading controller 206 sets, for each pixel that is to be processed, compensation factors for the shading compensation circuits 202r, 202g, and 202b. Digital filters 203r, 203g, and 203b perform filtering on the image data of the corresponding colors using filter factors that are different from pixel to pixel, and output the results. The original reading controller 206 sets, for each pixel, filter factors for the digital filters 203r, 203g, and 203b. The digital filters apply, to the image data, the factors determined so as to reduce color misalignment. Accordingly, it is possible to reduce color misalignment caused by relative misalignment of the projection positions of images on pixel lines of the three colors consisting of R, G, and B provided in the CCD line sensor 109. The original reading controller 206 and the digital filters are exemplary correcting units in which, with respect to the projection position of an image on a reference line sensor used as a reference among the plurality of line sensors, color misalignment caused by misalignment of the projection positions on the other line sensors is corrected in electrical signals. Furthermore, these constituent elements are exemplary correcting units that correct pixel data from the other line sensors in order to reduce color misalignment generated in the direction in which the plurality of line sensors are extended. The color misalignment is generated by a difference between the projection position of the image on the reference line sensor used as a reference among the plurality of line sensors and the projection positions of the images on the other line sensors. The original reading controller 206 is a main CPU that controls the entire operation of reading an original, and is connected via a control I/O interface to other circuits. The nonvolatile RAM 209 is used in order to back up information unique to the apparatus. In the nonvolatile RAM 209, color misalignment information indicating a color misalignment amount or a correction amount thereof is stored for each main-scanning position (one pixel). When reading an original, the original reading controller 206 reads the color misalignment information stored in the nonvolatile RAM 209, and outputs the information reflected in control parameters to the digital filters 203r, 203g, and 203b. According to an instruction from a user input from an operation unit 207, the original reading controller 206 controls the image reading apparatus 100 to read an original.

Figure 3A:
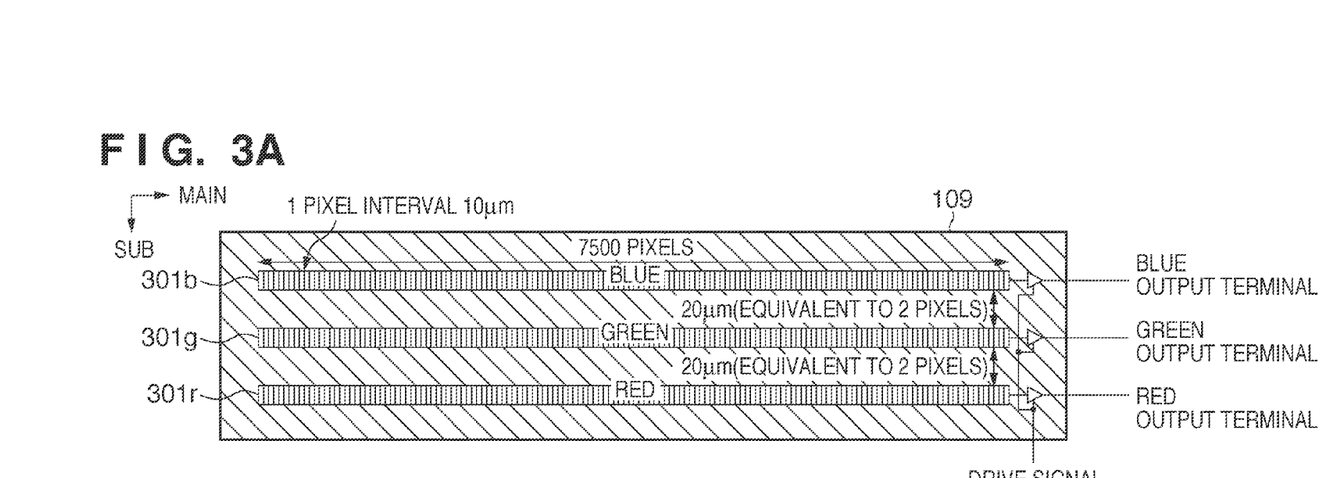
FIGS. 3A to 3C are views showing the configuration of a CCD line sensor, misalignment of imaging positions, and corrected imaging positions.

Hereinafter, how the color misalignment is generated will be described. The CCD line sensor 109 shown in FIG. 3A is provided with pixel lines 301r, 301g, and 301b in the shape of lines corresponding to three colors consisting of R, G, and B. The pixel line 301r is a color sensor that detects light in a red wavelength band. The pixel line 301g is a color sensor that detects light in a green wavelength band. The pixel line 301b is a color sensor that detects light in a blue wavelength band. Each pixel line (each line sensor) is provided with elements equivalent to 7500 pixels. Here, it is assumed that the interval between pixels is 10 μm. In the sub-scanning direction, pixel lines of the three colors consisting of R, G, and B are arranged at an interval of 20 μm. The interval in this specification refers to the distance from the center of a pixel to the center of another pixel. The optical magnification of the lens 108 is set such that an A4 color original (having a main-scanning width of 7016 pixels) can be read at a resolution of 600 dpi. Here, the number of pixels is merely an example. The positions at which light is incident on the pixel lines 301r, 301g, and 301b of the CCD line sensor 109 (the projection positions of images) are relatively misaligned in the main-scanning direction. It is ideal that the projection positions of images (the positions of pixels) corresponding to the pixel lines 301r, 301g, and 301b match the reading position on the original. However, due to chromatic aberration caused by the lens 108, spectral characteristics of a color filter for separating light into colors of R, G, and B, and the like, the projection positions of images of the respective colors are misaligned with respect to the ideal position. When image data is created in a misaligned state, images at different reading positions on the original are synthesized as images at the same position in image data, and, thus, color misalignment is generated. Here, color misalignment may be caused by size errors of optical components of the original reading unit 101 or the lens 108, non-uniformities in the positions where the CCD line sensor 109, the lens 108, and the mirrors 105, 106, and 107 are attached, and the like. Accordingly, the color misalignment amount of pixels differs from apparatus from apparatus.

Figure 3B:
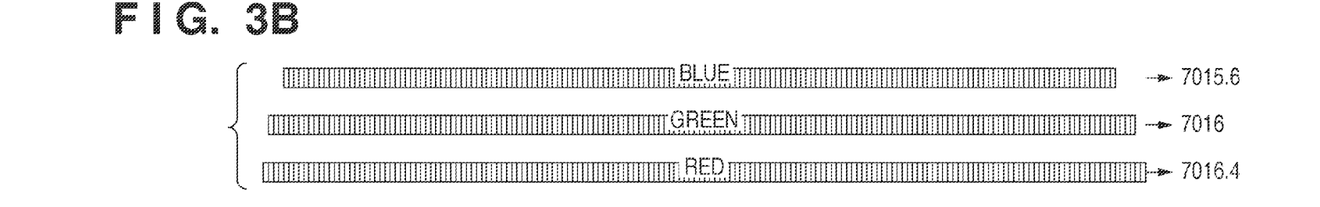

Hereinafter, an example of color misalignment characteristics in the main-scanning direction between R, G, and B will be described with reference to FIG. 3B. When reading an A4 original (600 dpi, main-scanning width of 7016 pixels), the projection widths (main-scanning magnifications) of R, G, and B images do not match each other due to chromatic aberration or the like. In this example, the magnifications differ from each other in order of R (7016.4 pixels)>G (7016 pixels)>B (7015.6 pixels). Here, the optical magnification of the lens 108 is set such that G magnification is 7016 pixels. If the main-scanning magnifications differ from each other in this manner, color misalignment is generated when R, G, and B image data is superimposed on each other.

Figure 4A:
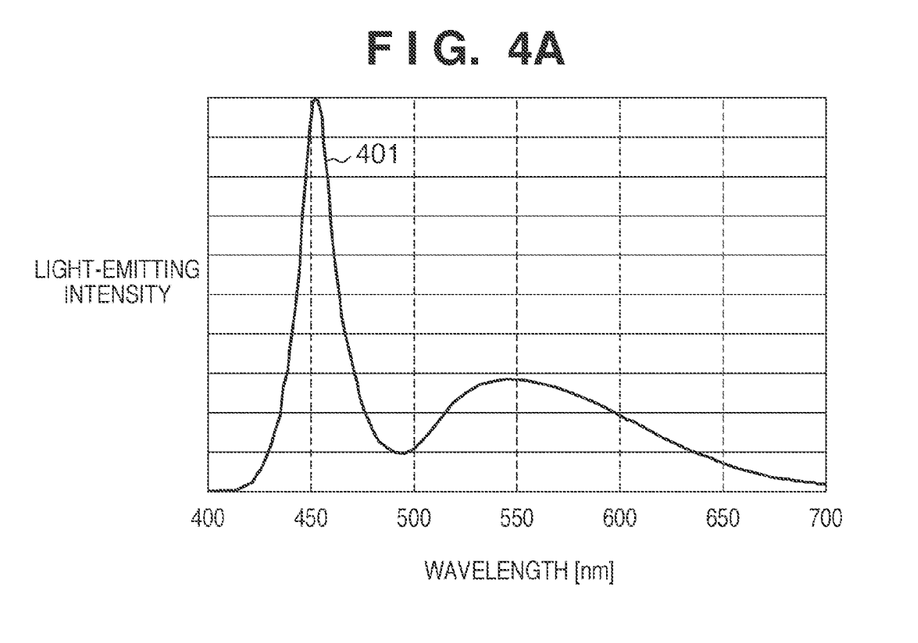
FIGS. 4A and 4B are graphs showing the spectral intensity of a white LED and the spectral sensitivity of a CCD line sensor.
Figure 4B:
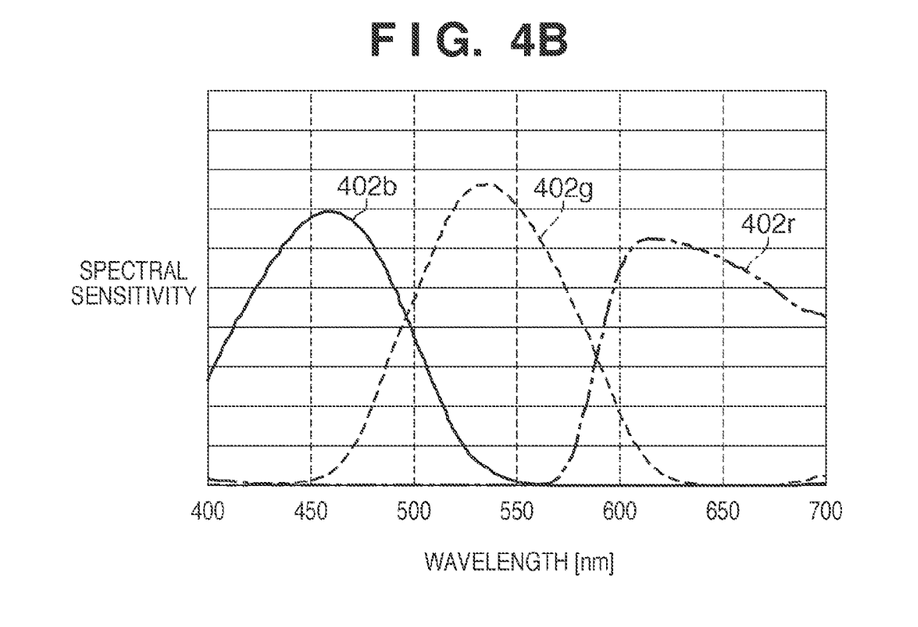
Figure 5A:
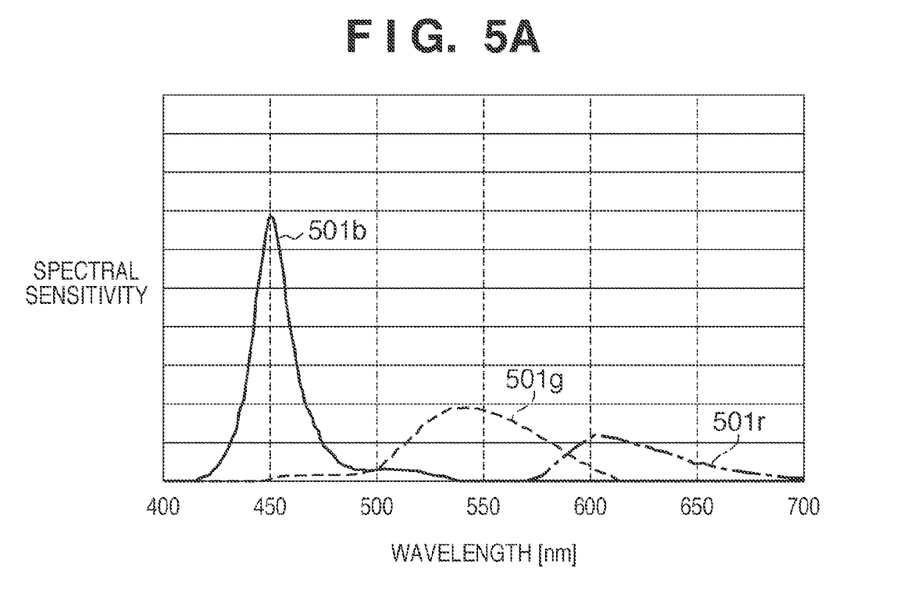
FIGS. 5A and 5B are graphs showing the integral spectral characteristics and the refractive index of crown glass.
Figure 5B:
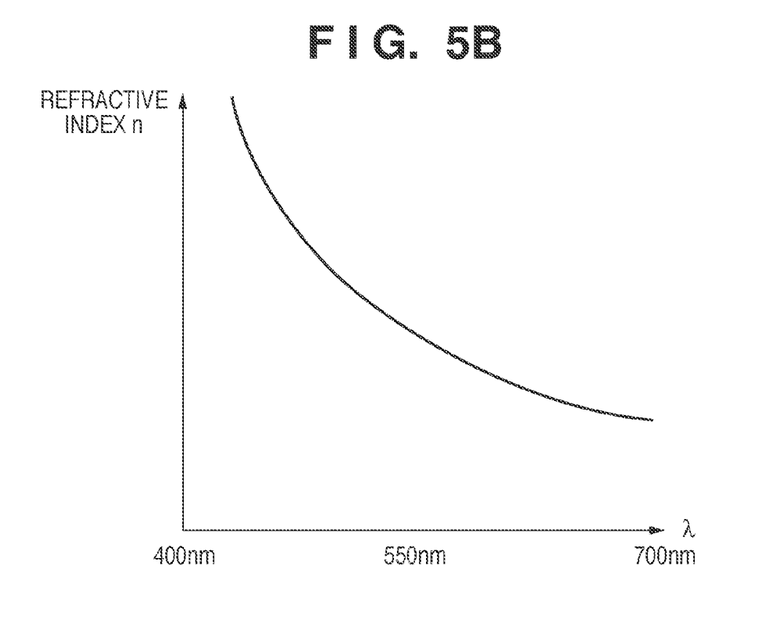

FIG. 4A shows a spectral light-emitting characteristic 401 of the white LEDs 104, and FIG. 4B shows respective spectral sensitivities 402r, 402g, and 402b of R, G, and B of the CCD line sensor 109. The reading spectral characteristics when reading an original are obtained as an integral value of these values. It can be seen that all spectral characteristics depend on the wavelength. FIG. 5A shows integral spectral characteristics 501r, 501g, and 501b of the white LEDs 104 and the CCD line sensor 109. Actually, spectral reflectance characteristics of the mirrors affect the integral spectral characteristics, but this aspect has been omitted in this example for the sake of explanation. In FIG. 5A, R is considered as an example. Despite being within the same color R, the wavelength band corresponding to R is actually as wide as 550 nm to 700 nm. Accordingly, light having various wavelengths is incident on the pixel line 301r that is a color sensor associated with R. FIG. 5B shows a refractive index n with respect to a wavelength λ of crown glass used as a material of the lens 108. Although crown glass is shown as an example, the application range of the present invention is not limited by the material. As shown in FIG. 5B, the refractive index varies according to the wavelength. Accordingly, when light having various wavelengths in the range from 550 nm to 700 nm is received, misalignment of the projection positions due to chromatic aberration is generated even in the case of the same color. In addition to misalignment of the projection positions (misalignment of the main-scanning magnifications) between the three colors shown in FIG. 3B, misalignment of the projection positions is generated also within the same color, and, thus, the resolution performance deteriorates, and the reading quality deteriorates. Here, the respective resolution performances for R, G, and B differ from each other. The reason for this is that, as shown in FIG. 5A, the widths of the R, G, and B wavelength bands differ from each other.

Figure 6:
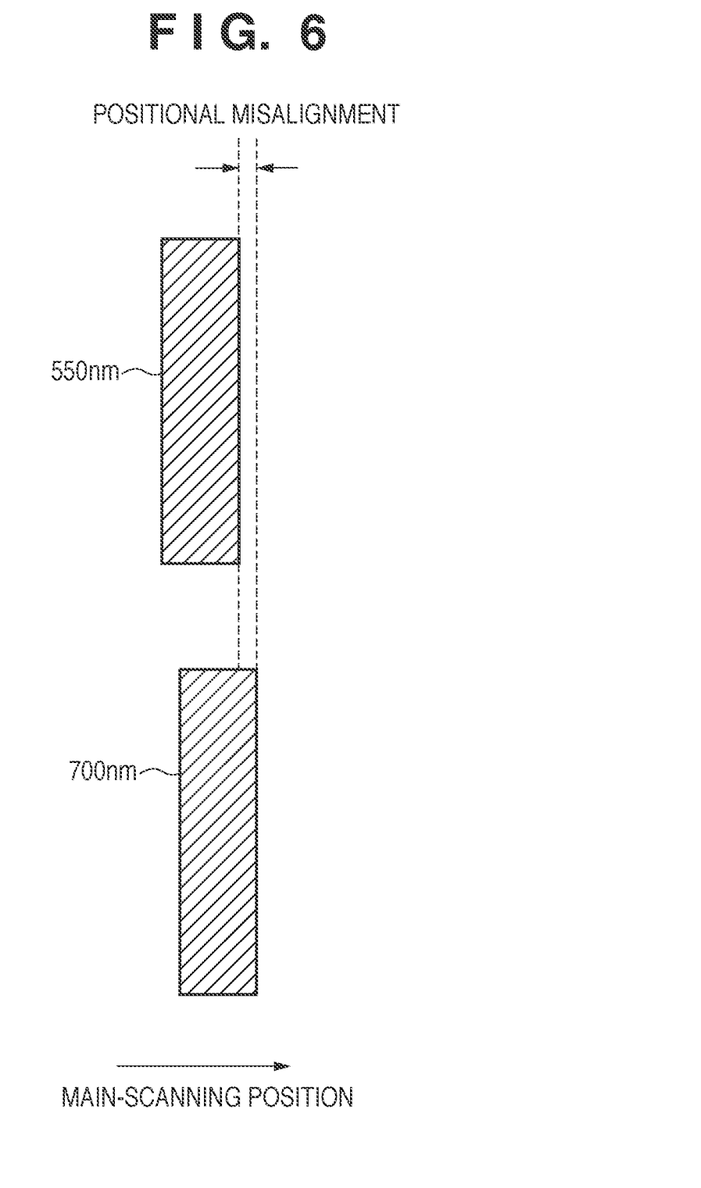
FIG. 6 is a diagram showing misalignment of imaging positions depending on wavelengths.

Hereinafter, a deterioration in the resolution performance will be further described. For example, when reading a thin line, the projection positions of images differ from each other between light at 550 nm and light at 700 nm as shown in FIG. 6. The reading characteristics of R are determined as an integral value of these values. The influence thereof varies depending on the wavelength distribution in each of R, G, and B wavelength bands, the intensity of each wavelength, and the refractive index of lens materials. Here, in this specification, the resolution performance is defined as below.

Resolution performance=(White reading value−Black reading value)/(White ideal value−Black ideal value)×100(%)

The resolution performance is calculated by substituting, for the above-shown equation, a white reading value and a black reading value obtained when reading a chart in which a white pixel that ideally can be read as 100 and a black pixel that ideally can be read as 5 are alternately arranged. Exemplary values obtained through calculation based on experimental results are as below.

R=85%
G=89%
B=93%

In this example, the resolution performance is higher in order of R<G<B. That is to say, it is seen that there is a difference between the R, G, and B resolution performances. The difference between the resolution performances is merely an example. The reason for this is that the resolution performances vary depending on the design of a lens, the spectral characteristics of the CCD line sensor 109 and a light source for illuminating an original, and the like. In this manner, the optical resolution performances are characteristics that are determined by the spectral characteristics of a light source, the respective spectral sensitivities of a plurality of line sensors, the spectral characteristics of an imaging unit, and the imaging characteristics of the imaging unit on the plurality of line sensors.

Here, a problem will be described that occurs when correcting color misalignment caused by misalignment of the projection positions of images in the main-scanning direction shown in FIG. 3B. The misalignment of the projection positions (main-scanning widths) of images of the respective colors shown in FIG. 3B is corrected using G as a reference. That is to say, the digital filters 203r, 203g, and 203b correct the main-scanning widths of R and B to 7016 pixels, this width being the same as that of G, by performing linear interpolation.

Figure 7:
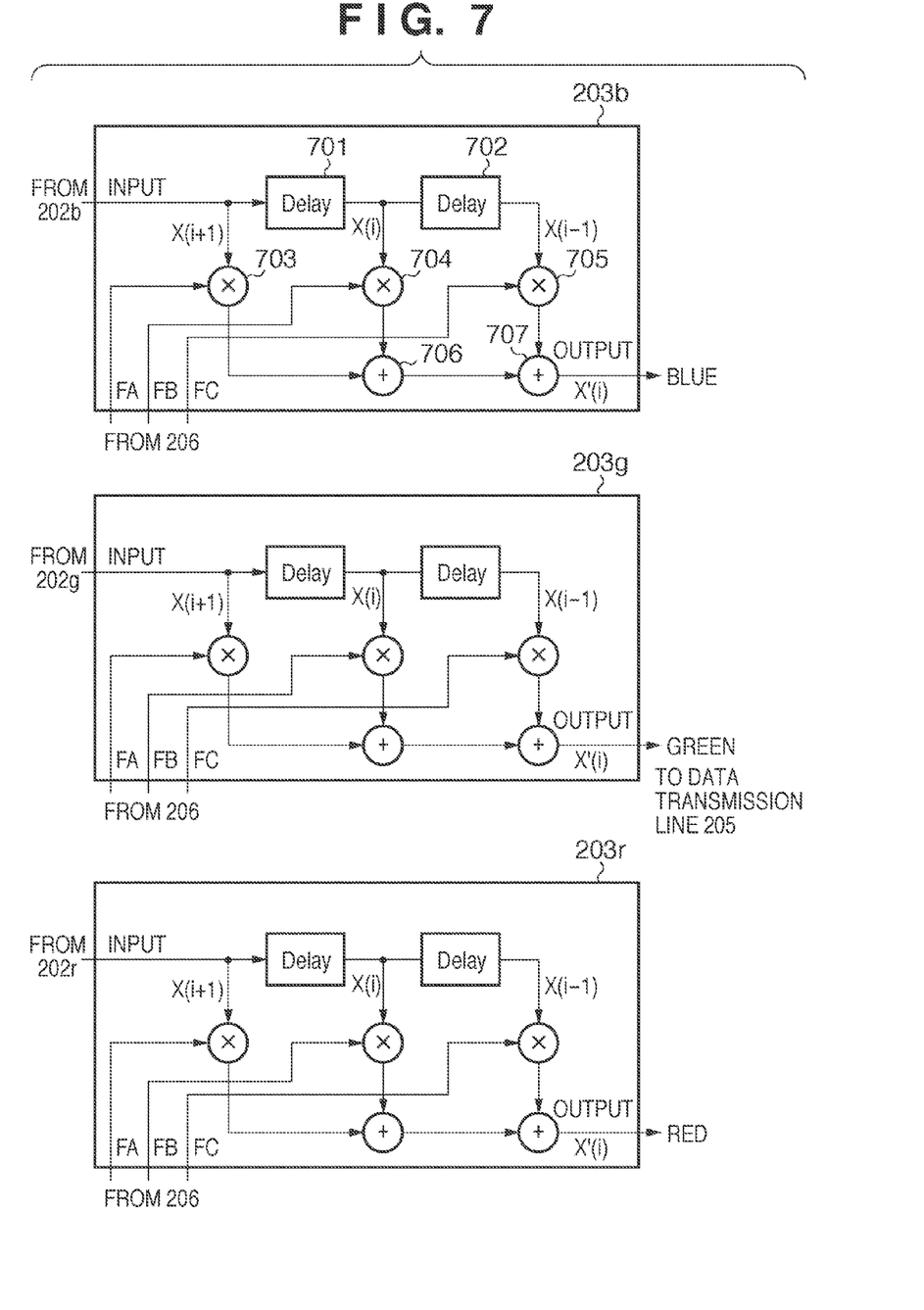
FIG. 7 is a diagram showing an exemplary configuration of digital filters.

Hereinafter, the circuit configuration of the digital filters 203r, 203g, and 203b will be described with reference to FIG. 7. The digital filters are circuits that read corresponding compensation factors from a storage circuit, apply the factors to pixel data corresponding to one or more adjacent main-scanning positions output from a correction target line sensor, and output corrected pixel data. Each digital filter is provided with two delay circuits 701 and 702, three multipliers 703, 704, and 705, and two adders 706 and 707. The delay circuits 701 and 702 each delay an input image signal by one pixel. The multipliers 703, 704, and 705 each multiply the input image signals by compensation factors (filter factors) FA, FB, and FC set by the original reading controller 206. The adders 706 and 707 add the input image signals multiplied by the filter factors. The processing in the digital filters 203r, 203g, and 203b can be shown by the following equation.

$$X'(i)=X(i-1)\times FA(i)+X(i)\times FB(i)+X(i+1)\times FC(i)$$

Here, the variables and the factors represent the following.

i: Position of a pixel in the main-scanning direction

X'(i): Image data of a pixel of interest after correcting positional misalignment X(i): Image data of a pixel of interest before correcting positional misalignment X(i+1): Image data of a pixel positioned in the main-scanning direction directly after a pixel of interest before correcting positional misalignment X(i−1): Image data of a pixel positioned in the main-scanning direction directly before a pixel of interest before correcting positional misalignment FA(i): Filter factor by which X(i+1) is multiplied
FB(i): Filter factor by which X(i) is multiplied
FC(i): Filter factor by which X(i−1) is multiplied The original reading controller 206 reads the filter factors FA(i), FB(i), and FC(i) from the nonvolatile RAM 209 for each pixel, and sets the factors for the digital filters 203r, 203g, and 203b. The filter factors FA(i), FB(i), and FC(i) functioning as compensation factors are factors set for each main-scanning position. The nonvolatile RAM 209 is an exemplary storage circuit that stores compensation factors used for correcting color misalignment of each correction target line sensor. For example, it is assumed that a main-scanning position corresponding to the 3500th G pixel matches the 3499.9th R pixel. In this case, R need only be shifted by +0.1 pixel with respect to G. In order to realize this operation, X'(3500) after correction need only be calculated using the following equation for the digital filter 203r:

$$X'(3500)=X(3499) \times 0 + X(3500) \times 0.9 + X(3501) \times 0.1$$

That is to say, in order to shift R by +0.1 pixel with respect to G, the filter factors for the 3500th R pixel need only be set such that the filter factor FA(3500)=0, the filter factor FB(3500)=0.9, and the filter factor FC(3500)=0.1. If the digital filters 203r, 203g, and 203b perform linear interpolation while the original reading controller 206 switching filter factors for each pixel in this manner, color misalignment of correction target colors with respect to a reference color is reduced. The digital filters 203r, 203g, and 203b are exemplary correction circuits that correct image data using compensation factors read from a storage circuit for each correction target line sensor for which color misalignment is to be corrected using a reference line sensor as a reference. When correcting color misalignment using G as a reference color as described above, the filter factors that are to be applied to the digital filter 203g need only be set such that the filter factors FA(i) and FC(i) are 0 and FB(i) is 1. That is to say, color misalignment is not corrected for the reference color, and, thus, color misalignment is corrected only for R and B. Thus, the digital filter 203g may be omitted.

Figure 3C:
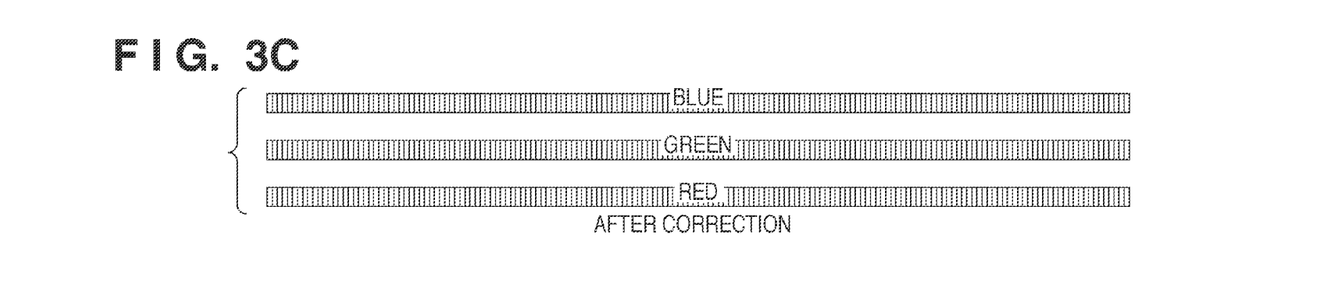

FIG. 3C shows various main-scanning widths after correcting color misalignment. As clearly seen through comparison with FIG. 3B, the main-scanning widths of the respective colors match each other. The color misalignment is reduced with this sort of correction, but the resolution performance deteriorates due to linear interpolation. Thus, the present invention proposes to suppress a deterioration in the resolution performance, focusing on selection of a color that is to be used as a reference when correcting color misalignment.

Figure 8A:
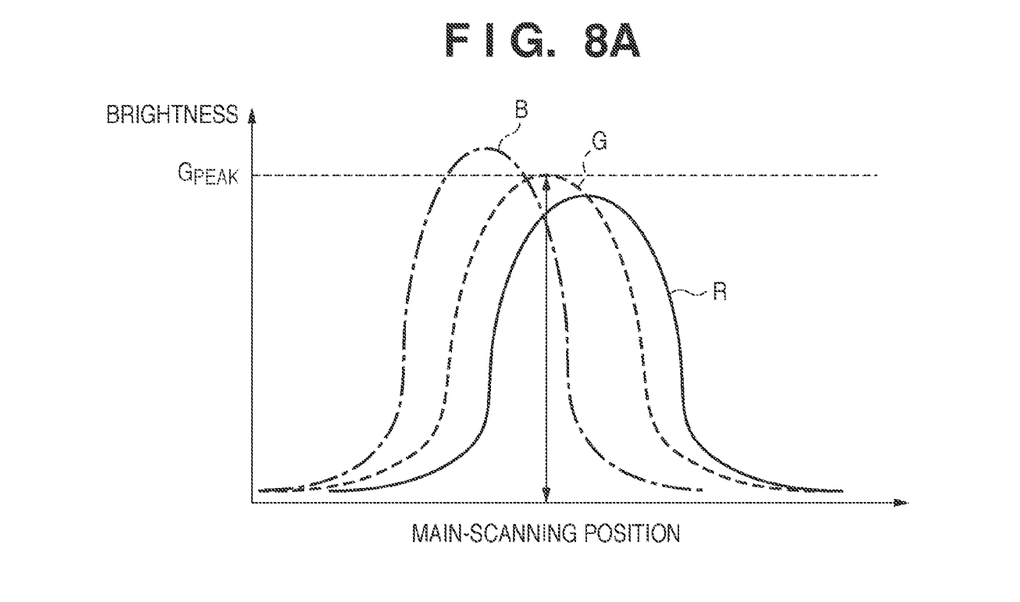
FIGS. 8A and 8B are graphs showing an example where positional misalignment is corrected using G as a reference.
Figure 8B:
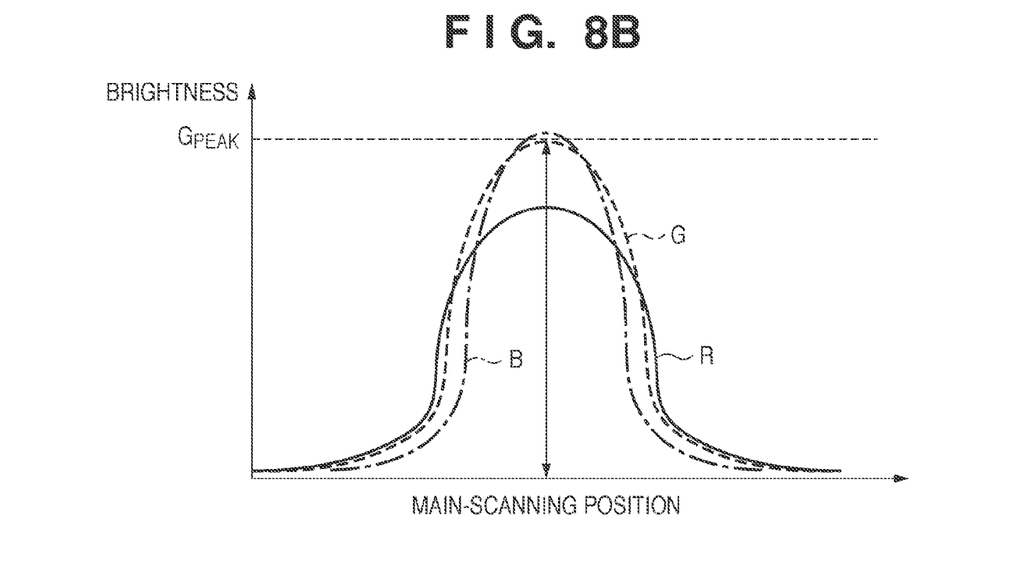

With reference to FIGS. 8A and 8B, a comparison is made between image data before correcting color misalignment (FIG. 8A) when a thin line that can be read in the same brightness and the same width in all of R, G, and B is read, and image data after correcting color misalignment using G as a reference (FIG. 8B). Here, in FIGS. 8A and 8B, the vertical axes indicate brightness, and the horizontal axes indicate main-scanning width. The resolution performance for R that is the lowest due to the influence of chromatic aberration within the same color is further lowered by the correction. As a result, color blurring (the portion where R, G, and B do not overlap each other in FIG. 8B) increases. In this manner, if there is even one color for which the resolution performance is low, color blurring may be generated. In particular, when a color for which the resolution performance is relatively low is used as a reference, color blurring tends to be outstanding in the entire image. Thus, in the present invention, R that is a color most greatly affected by a deterioration in the resolution performance determined by the wavelength width and the wavelength intensity in the integral spectral characteristics for each of R, G, and B is used as a reference, and color misalignment is corrected for the other colors. That is to say, among a plurality of line sensors, a line sensor having a relatively low (e.g., the lowest) optical resolution performance is selected as a reference line sensor. According to the present invention, the main-scanning magnifications of respective colors when reading an original are adjusted to the main-scanning magnification of a reference color that is used as a reference in the correction of color misalignment. Thus, the optical system of the image reading apparatus 100 need only be designed such that the optical magnification of the lens 108 is a predetermined optical magnification in a color in which a deterioration in the resolution performance is relatively large (e.g., the largest) among R, G, and B.

Figure 9A:
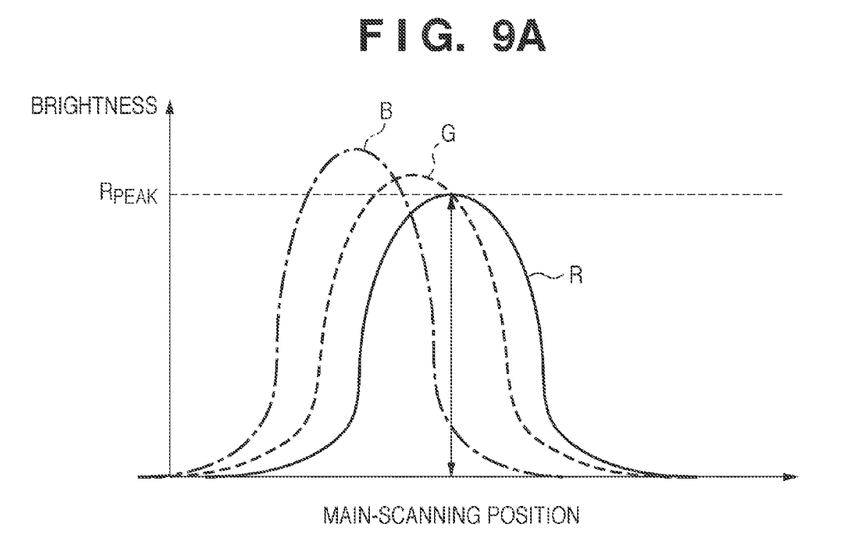
FIGS. 9A and 9B are graphs showing an example where positional misalignment is corrected using R as a reference.
Figure 9B:
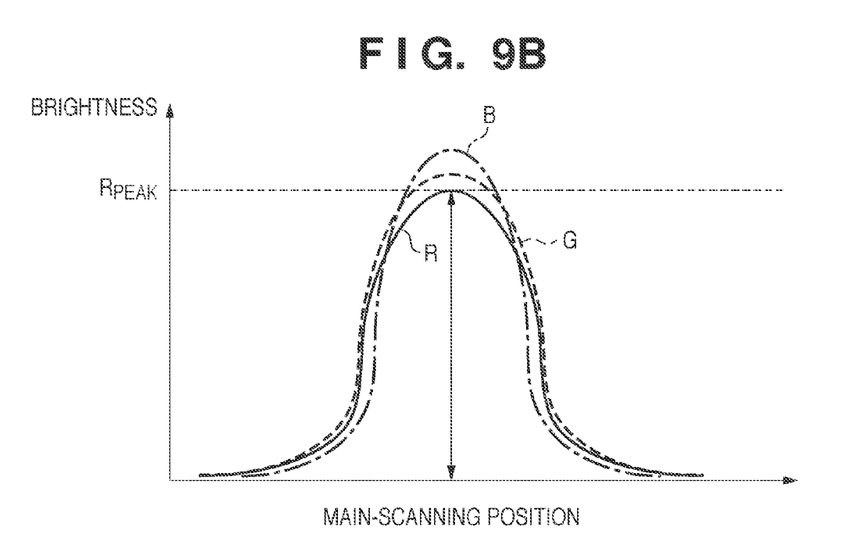

FIG. 9A shows an example where a thin line is read in the same conditions as those of FIGS. 8A and 8B. In FIG. 9A, it is assumed that R is a reference color in the correction. FIG. 9B shows an example where B and G are corrected using R as a reference. The vertical axes indicate brightness, and the horizontal axes indicate main-scanning width. As clearly seen through comparison between FIGS. 8B and 9B, an improvement is made in a portion where R, G, and B do not overlap each other, and in a difference between the levels of R, G, and B. Thus, according to the present invention, it is possible to reduce color misalignment between R, G, and B while suppressing a further deterioration in resolution performance caused as a side effect of the correction in a color for which the resolution performance is relatively low. As a result, color blurring and the like can be reduced compared with those in conventional examples, and the reading quality can be improved.

Figure 10:
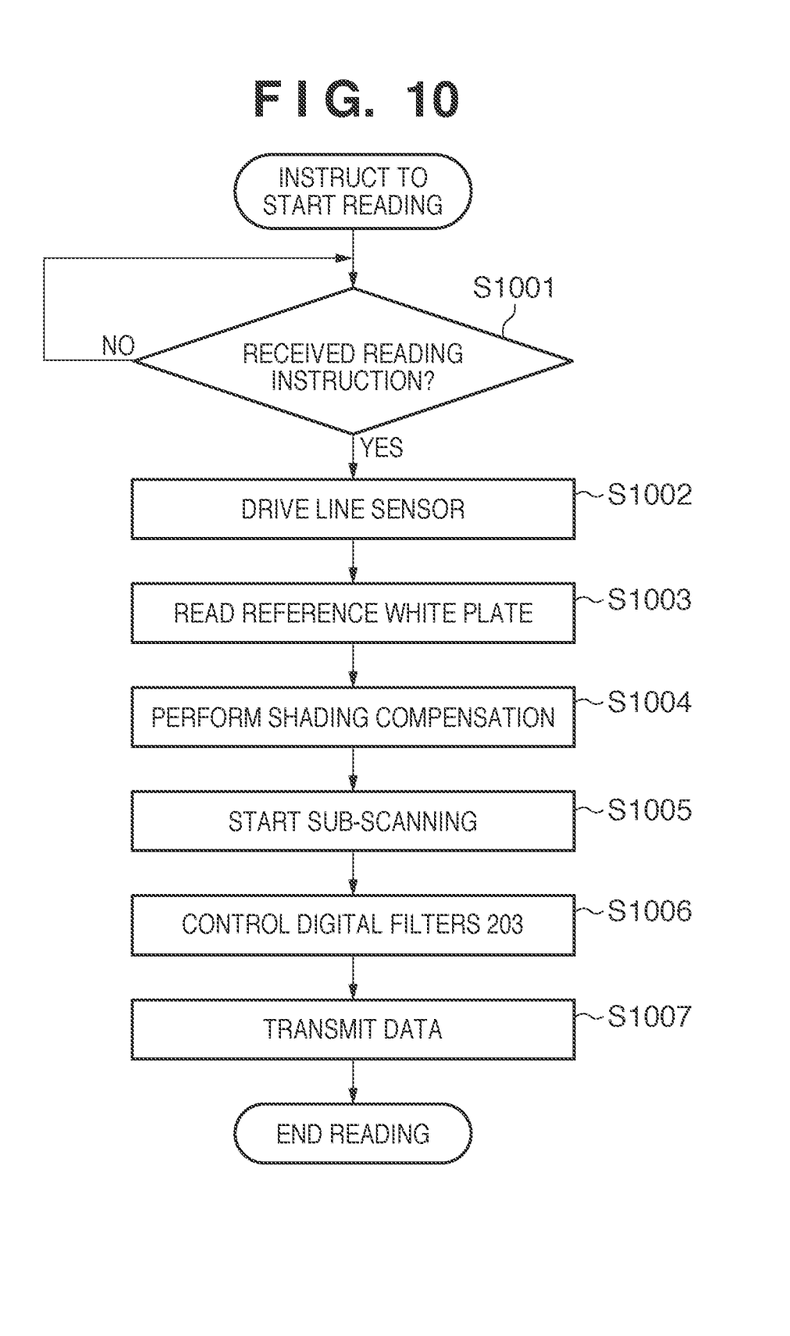
FIG. 10 is a flowchart showing a control flow.

Hereinafter, an operation of the original reading unit 101 reading the original 102 will be described with reference to the flowchart in FIG. 10. In S1001, the original reading controller 206 determines whether or not an instruction to read an original has been given from the operation unit 207.

If the instruction to read an original is input, the procedure advances to S1002. In S1002, the original reading controller 206 starts driving of the CCD line sensor 109 by starting transmission of a drive signal to the timing generator circuit 208. In S1003, the original reading controller 206 controls the motor 111 so as to move the optical benches 112 and 113 to positions where the reference white plate 114 can be read. When the home position sensor 115 detects the optical bench 112, the original reading controller 206 stops the motor 111 and lights the white LEDs 104. In S1003, the CCD line sensor 109 reads the reference white plate 114, and outputs an analog image signal. In S1004, the original reading controller 206 determines shading compensation factors for correcting non-uniformity in the light intensity of the white LEDs 104 and non-uniformity in the sensitivity of the CCD line sensor 109 based on the result obtained by reading the reference white plate 114, and stores the factors in the nonvolatile RAM 209. In S1005, the original reading controller 206 starts sub-scanning of the original 102 by controlling the motor 111 so as to move the optical benches 112 and 113. Accordingly, reading of the original 102 is started.

In Step S1006, the original reading controller 206 sets filter factors stored in the nonvolatile RAM 209 for the digital filters 203r, 203g, and 203b, while switching the filter factors for each pixel. As described above, the filter factors FA(i), FB(i), and FC(i) are factors that are determined in advance in the case of using a color in which a deterioration in the resolution performance is relatively large (R in this example) as a reference color. Here, the original reading controller 206 may calculate the filter factors FA(i), FB(i), and FC(i) from respective color misalignment amounts of R, G, and B stored in the nonvolatile RAM 209. Furthermore, the original reading controller 206 may measure in advance respective color misalignment amounts of R, G, and B by reading a predetermined thin line pattern or the like. The reason for this is to take into consideration a change over time of the optical system and the like of the image reading apparatus 100. For example, the original reading controller 206 calculates a positional misalignment amount of correction target colors with respect to the reference color for each pixel, the misalignment amount being stored in the nonvolatile RAM 209. Furthermore, the original reading controller 206 determines, through linear interpolation, a shift amount for shifting the correction target colors (G and B in this example) in the X(i−1) pixel direction or the X(i+1) pixel direction based on the calculated positional misalignment amount. That is to say, the filter factors FA(i), FB(i), and FC(i) set for the digital filters 203g and 203b are determined. For example, in order to shift X(i) in the X(i−1) pixel direction by 0.1, the factors need only be set such that the filter factor FA(i)=0.1, FB (i)=0.9, and FC(i) =0. For the digital filter 203r of R used as the reference color, the factors are set such that FA(i)=0, FB (i)=1, and FC(i)=0. That is to say, X'(i)=X. Here, the filter factors are determined for each pixel. The multiplier 704 functions as a first multiplier circuit that multiplies data (X) of a pixel of interest, which is pixel data that is to be corrected, by a corresponding first compensation factor. The multiplier 705 functions as a second multiplier circuit that multiplies data X(i−1) of a pixel corresponding to a main-scanning position directly before the pixel of interest in the main-scanning direction by a second compensation factor. The multiplier 703 functions as a third multiplier circuit that multiplies data X(i+1) of a pixel corresponding to a main-scanning position directly after the pixel of interest in the main-scanning direction by a third compensation factor. The adders 706 and 707 function as adder circuits that add output from the first multiplier circuit, the second multiplier circuit, and the third multiplier circuit, and output corrected data (X'(i)) of the pixel of interest at the imaging position. Lastly, in S1007, the corrected image data is transmitted via a data transmission line 205 to a printer or the like.

As described above, in the present invention, color misalignment is corrected using, as a reference, a line sensor having a relatively low optical resolution performance among a plurality of line sensors. If a line sensor having the lowest optical resolution performance is used as a reference line sensor, the quality of correction of color misalignment becomes highest. However, a line sensor having the second lowest optical resolution performance may be selected. The reason for this is that the quality of correction is better when a line sensor having the second lowest optical resolution performance is used as a reference than when a line sensor having the third lowest optical resolution performance is used. In this manner, according to the present invention, the quality of a read image is improved compared with that in conventional examples. Furthermore, compensation factors stored in the nonvolatile RAM 209 may be determined by reading a thin line at the time of shipment from a plant where the image reading apparatus 100 is manufactured. Accordingly, it is possible to reduce color misalignment caused by manufacturing errors due to size errors of the lens 108 that is an optical component of the original reading apparatus, non-uniformity in the arrangement of the CCD line sensor 109 and the lens 108, non-uniformity in the arrangement of the mirrors 105, 106, and 107, and the like. Here, in the present invention, the versatility can be increased by using a digital filter. Basically, the color misalignment amount differs from apparatus to apparatus. Thus, it is desirable to determine compensation factors for each apparatus. With the above-described digital filter, the compensation factors can be freely changed, and, thus, a digital filter with the same design can be applied to various image reading apparatuses. Here, a digital filter can be realized as a combination of a CPU and software, and, thus, this sort of combination is also possible if the processing capability of the CPU is high.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-155253, filed Jul. 7, 2010, which is hereby incorporated by reference herein in its entirety.

What is claimed is:

1. An original reading apparatus, comprising:
a light source configured to illuminate an original;
an imaging unit configured to image reflected light from the original illuminated by the light source;
a plurality of line sensors corresponding to a plurality of color components configured to convert the reflected light imaged by the imaging unit into a plurality of color component data; and
a correcting unit configured to perform color misalignment correction, based on a reference color component for which resolution performance is lowest among the plurality of color component, on the color component data corresponding to other color components;
wherein the correcting unit corrects a main-scanning magnification of the line sensors corresponding to the other color components based on a main-scanning magnification of the line sensor corresponding to the reference color component.

2. The original reading apparatus according to claim 1, wherein the correcting unit corrects a projection position on the line sensors corresponding to the other color components based on a projection position on the line sensor corresponding to the reference color component.

3. The original reading apparatus according to claim 1, wherein the correcting unit performs weighted addition processing on the color component data of a pixel of interest and the color component data of a neighboring pixel of the pixel of interest.

4. The original reading apparatus according to claim 1, wherein the plurality of line sensors include a red line sensor that detects light in a red wavelength band, a green line sensor that detects light in a green wavelength band, and a blue line sensor that detects light in a blue wavelength band, and
the reference color component is a red color component corresponding to the red line sensor.

5. An image processing apparatus, comprising:
an input unit configured to input a plurality of color component data from an original reading apparatus having a light source that illuminates an original, an imaging unit that images reflected light from the original illuminated by the light source, and a plurality of line sensors corresponding to a plurality of color components that convert the reflected light imaged by the imaging unit into the plurality of color component data;
a setting unit configured to set a factor based on a pixel position of color component data of interest; and
a correcting unit configured to perform color misalignment correction with the set factor, based on a reference color component for which resolution performance is lowest among the plurality of color component, on the color component data corresponding to other color components, wherein the correcting unit corrects a main-scanning magnification of the line sensors corresponding to the other color components based on a main-scanning magnification of the line sensor corresponding to the reference color component.

6. The original reading apparatus according to claim 1, wherein the correcting unit is further configured to correct a pixel of interest using a neighboring pixel neighboring to the pixel of interest in a main scanning direction and a coefficient which is based on a location of the neighboring pixel.

7. The original reading apparatus according to claim 6, wherein the correcting unit is further configured to correct the pixel of interest by multiplying the neighboring pixel with a first coefficient which is based on a location of the neighboring pixel, multiplying the pixel of interest with a second coefficient which is based on a location of the pixel of interest, and summing a product of the neighboring pixel and the first coefficient and a product of the pixel of interest and the second coefficient.

8. The original reading apparatus according to claim 1, wherein the reference color component is a red component.

* * * * *